United States Patent Office 3,201,277
Patented Aug. 17, 1965

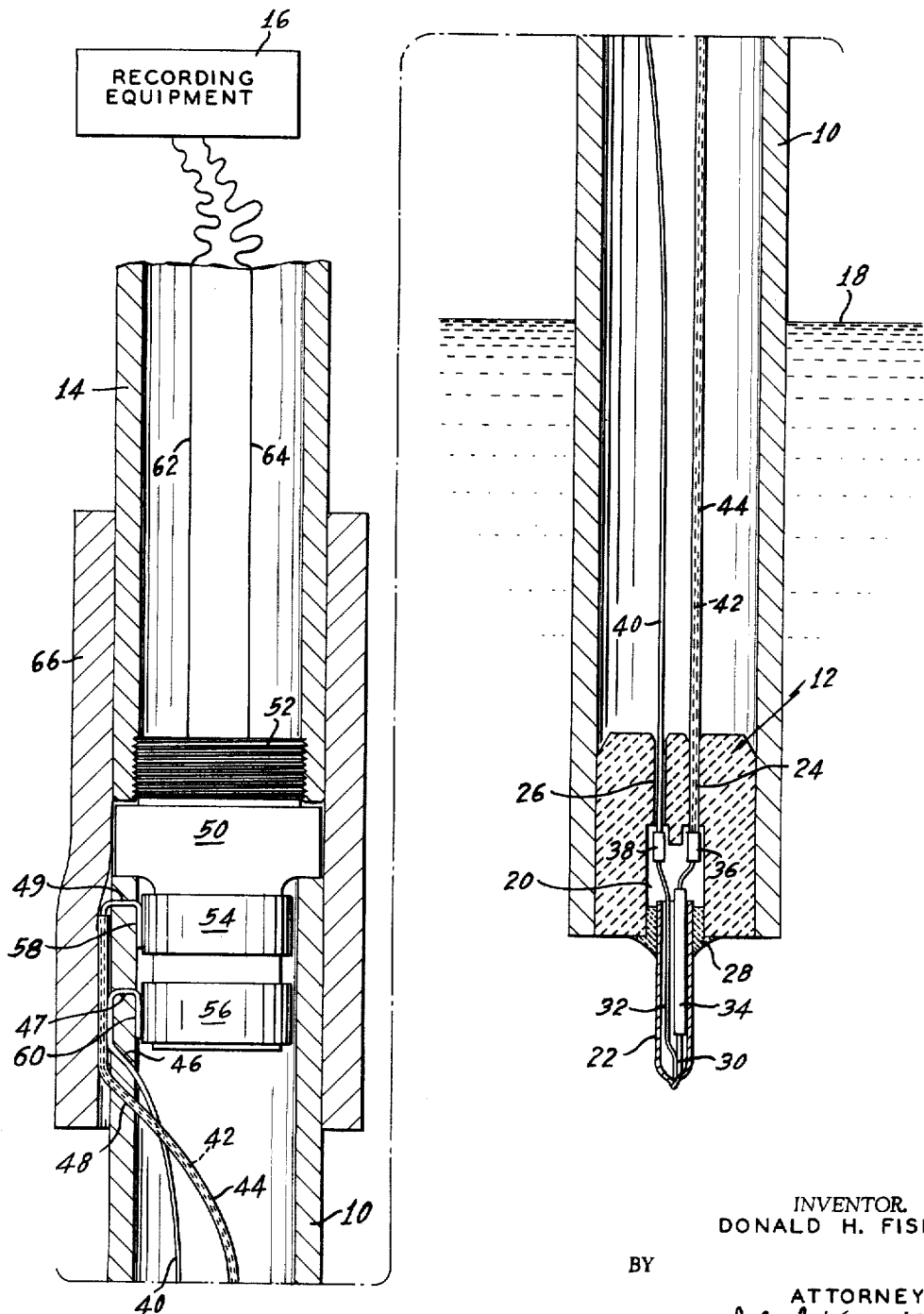

3,201,277
IMMERSION THERMOCOUPLE
Donald H. Fish, Livingston, N.J., assignor to Engelhard Industries, Inc., Newark, N.J., a corporation of Delaware
Filed Aug. 17, 1961, Ser. No. 132,144
1 Claim. (Cl. 136—4)

This invention relates to thermocouple assemblies and, more specifically, to devices for measuring the very high temperatures of liquids, such as molten steel or other metals.

In the field of metallurgy, there are numerous instances in which the temperature of molten metals must be measured. As a specific example, the control of the temperature of steel in both open hearth and electric furnaces is necessary for various reasons well known in the art. Generally, readings must be taken several times during the melting process of one batch. Devices using thermocouples have been developed which are immersed into the molten mass by means of an elongated tubular structure provided with a handle at one end and supporting a sensing head at the other end, which in turn, supports the sensing thermoelement. A remote recorder indicates the temperature of the molten steel as a function of the electromotive force developed. The structure must be sufficiently long for safely immersing the sensing head, generally through a porthole in the furnace wall.

Evidently, with molten steel temperatures in the range of 2400° F. and above, most materials deteriorate and destruction of the entire head, including the thermoelement, cannot be avoided. Other expensive elements, such as connectors and protecting components, are also destroyed. Therefore, the costs of each reading are high, due to the loss of material and labor, and time consuming maintenance steps are required between each of a series of readings.

As another, equally important problem arising in connection with the use of immersion thermocouples is the fact that metallic portions of the measuring device, upon contact with molten metal, are heated to the melting temperature of the metal used. The device, or at least the outer portion thereof, is therefore, not only destroyed, but melts, and subsequently constitutes an impurity in the molten metal. This is frequently considered a severe drawback, and there is a need for immersion thermocouples leaving practically no impurities in the mass, and of which the expendable portion, subject to destruction during the reading interval, is sufficiently inexpensive for economical reasons.

Reducing the costs of measuring the temperature of molten metal is therefore the principal object of this invention. Another object of the present invention is to prevent deterioration of an entire, comparatively costly temperature measuring unit. Providing an expendable immersion thermocouple assembly which does not impair the purity of the molten metal of which the temperature is to be measured forms another important object of the present invention.

It is an established fact that the time of immersion required for obtaining an exact reading is from about 6 to 10 seconds. The immersed portion of the device, which portion constitutes the critical component thereof, must resist the very high temperature for this period of time to assure satisfactory results. For this reason, metallic supports, generally metal tubes, have been used for supporting refractory sensing heads which, in turn, support the thermocouple arranged in a protective tube of metal or vitreous material, such as, glass or quartz. In some instances, the conventional tubular metal support is protected by an outer, thick-walled tube and cardboard, preferably impregnated with silica or another suitable refractory. However, such tube, when immersed into molten steel is subject to destruction by carbonization, so that after a very short time the inner, metallic support comes into contact with the steel and melts. Similarly, metallic connectors or any other metallic part present in the immersed portion of the assembly, is also at least partly heated to its melting point and combines with the molten mass to form an impurity. Accordingly, the loss is double inasmuch as material and finished components involving labor are destroyed.

It has been found that, in contrast with the generally accepted opinion, the metallic holding structure can be dispensed with, when using instead a structure made of non-metallic material which is not melted at the temperature of the molten metal to be measured.

In its broadest aspect, therefore, the invention resides in the use of a material for the immersed portion of the assembly which, without melting, remains in the solid state. As a matter of course, any material which may be considered from a practical point of view will undergo some change during the 6 to 10 seconds period of immersion in molten steel, such changes include mainly carbonization and sintering.

Disregarding the thermocouple wires proper and the lead-in wires which constitute necessary components of metallic nature, but of insignificant mass, the thermocouple assembly in accordance with the device according to the invention includes a supporting structure consisting exclusively of materials remaining in the solid state, in spite of exposure to very high temperatures.

In accordance with one of the more important features of the invention, the supporting structure is preferably made from cardboard, especially when impregnated with refractory material, such as silica. Generally, such supporting structure has the form of an elongated tube, supporting in one of its open ends a sensing head supporting the thermocouple enclosed in a quartz tube as is conventional with this type of device, which head, in turn, may be made of impregnated cardboard or of any refractory material which is subject to sintering when immersed into molten metal such as steel. The cardboard especially when impregnated with silica, upon immersion, is carbonized and, when sufficiently thick, will not be entirely carbonized after the period of 6–10 seconds required for one reading. However, even when entirely carbonized, no metal or no substantial quantity of metal is present which could melt and thereby impair the molten metal of which the temperature is to be measured. The exclusion of this hazardous, accidental introduction of impairing impurities constitutes one of the more important improvements over the prior art achieved by the present invention.

Additional features of this invention include the arrangement of a conventional coaxial telephone-jack type connector which is removably mounted at the upper open end of the cardboard tube. Thereby, the connector remains sufficiently spaced from the molten steel and remains intact during each reading. In other words, the connector does not form part of the expendable section of the device.

The invention will be more clearly understood from a consideration of the following detailed description and the accompanying drawing which is a longitudinal sectional view through an immersion thermocouple in accordance with the invention.

The immersion thermocouple illustrated in the drawing includes a cardboard tube 10 supporting a sensing head, generally designated 12, and is supported by any of the conventional assemblies (not shown) terminating in a steel pipe 14. It will be understood that the upper portion of the steel pipe 14 may suitably form a handle, and is provided with conventional means for connection to the recording equipment 16. In the drawing, the tube 10, which in practice has a length of about 3 to 5 feet, is shown as immersed and partly protruding above the level 18 of a high temperature liquid, such as molten steel.

The sensing head 12, preferably formed either from refractory material, such as that known under the tradename "Steatite," or from cardboard, is mounted in the lower end of the tube 10 by frictional engagement. A larger bore 20 in the lower side of the head 12 accommodates a small quartz tube 22 and communicates with two small bores 24 and 26 extending toward the upper and inner end of the head 12. The quartz tube 22 is maintained with the bore 20 by means of refractory cement 28. The junction 30 of the thermocouple 32 is located within the lower, closed end of the quartz tube 22. In order to avoid contact between the two wires of the thermocouple, a quartz bead 34 surrounds one of the wires. At the locations 36 and 38, the thermocouple wires are connected to lead-in wires 40 and 42, of which the wire 42 carries an insulation 44 in order to prevent short-circuiting. The upper ends of wires 30 and 42 are attached to the inside wall of the tube 10, suitably at locations opposite each other. This may be accomplished by pulling the ends of the wires 40 and 42, each through a pair of adjacent bores 46, 47, 48 and 49, respectively, as shown, so that the portion or the section of the wires adjacent the walls form convenient contact surfaces 58 and 60 for cooperation with a coaxial telephone jack type connector 50.

At this point, it should be noted that the assembly as described, with the exception of the connector 50, constitutes the expendable portion of the device. As set forth above, destruction of the thermocouple, its immediate supporting structure in the form of the quartz tube 22, the head 12 and the tube 10, can not be avoided when measuring the temperature of molten steel. However, it will be understood that the expendable section of the device includes no significant mass of metal which could melt in and impair the molten steel. As a matter of fact, the metal involved merely includes the thermocouple wires and the lead-in wires, all of which represent an insignificant mass of metal. The main component of the entire supporting and shielding structure are the head 12 made of refractory material and therefore subject to sintering under operating conditions. The second important component, forming the shielding structure for the lead-in wires 40 and 42, is the tube 10 which, in accordance with the invention, is made from material subject to carbonization without melting when exposed to the temperature of molten metal such as steel. Accordingly, the immersed section of the measuring device in accordance with the invention includes practically no significant quantities of metal so that no impurities are introduced into the molten mass. The materials selected in accordance with the invention are preferably either subject to sintering or to carbonization, with neither of them having impairing effects on the molten metal, no matter how long the assembly remains in contact with it.

As an alternative embodiment, the head 12 may be formed from the same material as the tube 10, i.e., from cardboard, preferably impregnated with silica.

The upper portion of the assembly illustrated in the drawing includes the steel pipe 14 supporting the connector 50, for example by means of a restricted portion 52 protruding into it and threadably engaging the pipe 14. The connector 50 is provided with annular contacting surfaces 54 and 56 making contact with the blank end 58 of lead-in wire 42 and the end 60 of lead-in wire 40, respectively. Connection with the recording equipment 16 is made by leads 62 and 64 extending through the pipe 14. Since this portion of the assembly, which suitably includes a hand and a further connector, does not form part of this invention, it has been omitted in the drawing. The expendable tube 10 and the permanent pipe 14 are joined to each other by means of a short cardboard coupling 66 secured to the cardboard tube 10 and covering the outer portions of the ends of lead-in wires 40 and 42 between the bores 46, 47, 48 and 49, respectively.

It will be obvious to those skilled in the art that many more modifications may be made within the scope of the present invention without departing from the spirit thereof, and the invention includes all such modifications.

What is claimed is:

In a temperature measuring device for molten metal, a thermocouple, a protective assembly for the thermocouple including a vitreous tube encompassing the thermocouple and a head supporting the tube, lead-in wires connected to the thermocouple, and elongated tubular shielding means for supporting the head with the lead-in wires extending through it, the shielding means consisting of cardboard impregnated with silica and the head consisting of cardboard whereby the non-metallic materials of the shielding means, upon immersion into the molten metal, are subject to both carbonization and sintering.

References Cited by the Examiner

UNITED STATES PATENTS

| 2,384,024 | 9/45 | Goller | 136—4.772 |
| 2,963,532 | 12/60 | Bell | 136—4.7 |
| 2,993,944 | 7/61 | Silver | 136—4.7 |
| 2,999,121 | 9/61 | Mead | 136—4.7 |

WINSTON A. DOUGLAS, *Primary Examiner.*

JOHN H. MACK, *Examiner.*